US011974354B2

(12) United States Patent
Martin

(10) Patent No.: US 11,974,354 B2
(45) Date of Patent: *Apr. 30, 2024

(54) TELECOMMUNICATIONS APPARATUS AND METHODS

(71) Applicant: Sony Group Corporation, Tokyo (JP)

(72) Inventor: Brian Alexander Martin, Basingstoke (GB)

(73) Assignee: SONY GROUP CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/703,988

(22) Filed: Mar. 25, 2022

(65) Prior Publication Data
US 2022/0217523 A1 Jul. 7, 2022

Related U.S. Application Data

(63) Continuation of application No. 15/109,765, filed as application No. PCT/EP2014/077396 on Dec. 11, 2014, now Pat. No. 11,290,865.

(30) Foreign Application Priority Data

Jan. 29, 2014 (EP) .................................. 14153010

(51) Int. Cl.
*H04W 36/00* (2009.01)
*H04W 4/029* (2018.01)
(Continued)

(52) U.S. Cl.
CPC ............. *H04W 8/08* (2013.01); *H04W 4/029* (2018.02); *H04W 8/00* (2013.01); *H04W 36/00* (2013.01); *H04W 36/03* (2018.08); *H04W 88/02* (2013.01)

(58) Field of Classification Search
CPC ......... H04W 8/08; H04W 4/029; H04W 8/00; H04W 36/00; H04W 36/03; H04W 88/02
See application file for complete search history.

(56) References Cited

U.S. PATENT DOCUMENTS

2010/0004005 A1   1/2010   Pereira et al.
2010/0316034 A1   12/2010   Burbidge et al.
(Continued)

FOREIGN PATENT DOCUMENTS

EP   2636231 A   9/2013
GB   2513181 A   10/2014
(Continued)

OTHER PUBLICATIONS

International Search Report and Written Opinion dated Apr. 2, 2015, in PCT/EP2014/077396 filed Dec. 11, 2014.
(Continued)

*Primary Examiner* — Marcos L Torres
(74) *Attorney, Agent, or Firm* — XSENSUS LLP

(57) ABSTRACT

A wireless telecommunication system comprises a base station and a terminal device (UE). The UE is configured to determine its mobility status and an associated reliability. The UE is configured to convey an indication of the mobility status and the reliability to the base station. The base station may then configure the UE for operation within the wireless telecommunications system in a manner that takes account of both the mobility status and the reliability for the mobility status. This can help optimise configuration settings for the UE which depend on device mobility.

20 Claims, 3 Drawing Sheets

(51) Int. Cl.
*H04W 8/00* (2009.01)
*H04W 8/08* (2009.01)
*H04W 88/02* (2009.01)

(56) References Cited

U.S. PATENT DOCUMENTS

| | | | |
|---|---|---|---|
| 2012/0015646 A1 | 1/2012 | Burbidge et al. | |
| 2013/0188503 A1* | 7/2013 | Anepu | H04W 24/10 370/252 |
| 2013/0322360 A1 | 12/2013 | Fan et al. | |
| 2016/0187458 A1* | 6/2016 | Shah | H04W 4/02 455/456.1 |
| 2017/0318611 A1* | 11/2017 | Tsuboi | H04W 76/10 |
| 2019/0098525 A1* | 3/2019 | Hessler | H04L 5/0048 |

FOREIGN PATENT DOCUMENTS

| | | |
|---|---|---|
| GB | 2513182 A | 10/2014 |
| TW | 252641 B | 4/2006 |
| TW | 267011 B | 11/2006 |
| TW | M441886 U | 11/2012 |
| TW | M462412 U | 9/2013 |
| TW | I416896 B | 11/2013 |
| WO | 2012/059636 A1 | 5/2012 |
| WO | 2013/147499 A1 | 10/2013 |

OTHER PUBLICATIONS

3rd Generation Partnership Project; ETSI TS 136 304 V11.5.0, Technical Specification, "LTE; Evolved Universal Terrestrial Radio Access (E-UTRA); User Equipment (UE) procedures in idle mode", (3GPP TS 36.304, version 11.5.0 Release 11), (Sep. 2013), 36 pages.
3rd Generation Partnership Project; TSG-RAN WG2 Meeting #81bis. R2-131422, Agenda Item 7.1.1, Nokia Siemens Networks, Nokia Corporation, "Enhanced Mobility State Estimation", (Apr. 2013), 14 pages.
3rd Generation Partnership Project; TSG RAN WG2 Meeting #83bis. R2-133113. CATT, Agenda Item 7.1.1.1. "Mobility Information reporting when entering connected state", (Oct. 2013), 4 pages.
3rd Generation Partnership Project; TSG RAN WG2 Meeting #84, R2-133833, CATT, Agenda Item 7.1.1.1, "Details of mobility information reporting", (Nov. 2013), 5 pages.
3rd Generation Partnership Project; ETSI TS 122 368 V11.6.0. Release 11, "Digital cellular telecommunications system (Phase 2+); Universal Mobile Telecommunications System (UMTS); LTE; Service requirements for Machine-Type Communications (MTC); Stage 1", (Sep. 2012), 21 pages.
3rd Generation Partnership Project, ETSI TS 136 331 V11. 5 .0, Technical Specification, "LTE, Evolved Universal Terrestrial Radio Resource Control (RRC); Protocol specification", (3GPP TS 36.331, version 11.5.0 Release 11 ), (Sep. 2013), 351 pages.
H. Holma et al., "LTE for UMTS OFDMA and SC-FDMA Based Radio Access", John Wiley and Sons, (2009), 4 pages.
3rd Generation Partnership Project; TSG-RAN Meeting #58, RP-122007, Agenda Item 13.1, Alcatel-Lucent, Alcatel-Lucent Shanghai Bell, "New WI proposal: Hetnet Mobility Enhancements for LTE", (Dec. 2012), 6 pages.
3rd Generation Partnership Project; TR 36.839 V0.4.0, Release 11, "Technical Specification Group Radio Access Network Evolved Universal Terrestrial Radio Access (E-UTRA); Mobility Enhancements in Heterogeneous Networks", (Nov. 2011), 22 pages.
3rd Generation Partnership Project: TR 37.869 V0.2.0, Release 12, "Technical Specification Group Radio Access Network Study on Enhancements to Machine-Type Communications (MTC) and other Mobile Data Applications; Radio Access Network (RAN) aspects", (Apr. 2013), 13 pages.
3rd Generation Partnership Project; TSG-RAN Meeting #62, RP-132053. Agenda item 13.1.2, ZTE, "New WI Proposal: RAN enhancements for Machine-Type and other mobile data". (Dec. 2013), 5 pages.
Taiwanese Office Action in corresponding TW Application No. 103142197, dated Nov. 27, 2018 (with English Translation) 21 pages.
Taiwanese Search Report issued in corresponding TW application No. 103142197, dated Nov. 2, 2018 (with English Translation).

* cited by examiner

TELECOMMUNICATIONS APPARATUS AND METHODS

CROSS-REFERENCE TO RELATED APPLICATIONS

This application is a continuation of U.S. application Ser. No. 15/109,765, filed Jul. 5, 2016, which is based on PCT filing PCT/EP2014/077396, filed Dec. 11, 2014, which claims priority to European Patent Application 14153010.5, filed in the European Patent Office on Jan. 29, 2014, the entire contents of each are incorporated herein by reference.

BACKGROUND

Field

The present disclosure relates to telecommunications apparatus and methods. In particular, certain embodiments relate to schemes for communicating information regarding the mobility status of a terminal device in a wireless telecommunications system.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Wireless communication systems have evolved over the past ten years or so from the GSM System (Global System for Mobile communications) to the 3G system and now include packet data communications as well as circuit switched communications. The third generation partnership project (3GPP) is developing a fourth generation wireless communication system referred to as Long Term Evolution (LTE) in which a core network part has been evolved to form a more simplified architecture based on a merging of components of earlier wireless radio network architectures and a radio access interface which is based on Orthogonal Frequency Division Multiplexing (OFDM) on the downlink and Single Carrier Frequency Division Multiple Access (SC-FDMA) on the uplink.

Third and fourth generation wireless telecommunication systems, such as those based on the 3GPP defined UMTS and Long Term Evolution (LTE) architecture are becoming able to support a wider range of services than simple voice and messaging services offered by previous generations of wireless telecommunication systems. For example, with the improved radio interface and enhanced data rates provided by LTE systems, a user is able to enjoy high data rate applications such as wireless video streaming and wireless video conferencing that would previously only have been available via a fixed line data connection.

The deployment of third and fourth generation networks has also led to the parallel development of new classes of devices and applications which, rather than taking advantage of the high data rates available, instead take advantage of the robust radio interface and increasing ubiquity of the coverage area. Examples include so-called machine type communication (MTC) applications, some of which are in some respects typified by semi-autonomous or autonomous wireless communication devices (MTC devices) communicating small amounts of data on a relatively infrequent basis. Examples include so-called smart meters which, for example, are located in a customers home and periodically transmit data back to a central MTC server relating to the customers consumption of a utility such as gas, water, electricity and so on. Smart metering is merely one example of potential MTC device applications. Further information on characteristics of MTC-type devices can be found, for example, in the corresponding standards, such as ETSI TS 122 368 V11.6.0 (September 2012)/3GPP TS 22.368 version 11.6.0 (Release 11) [1]. Some typical characteristics of MTC type terminal devices/MTC type data might include, for example, characteristics such as low mobility, high delay tolerance, small data transmissions, a level of predictability for traffic usage and timing (i.e. traffic profile), relatively infrequent transmissions and group-based features, policing and addressing.

It has been recognised that it can in some circumstances be beneficial for terminal devices to be configured to operate differently within wireless telecommunication systems according to their particular characteristics. One such characteristic which can impact the optimum configuration parameters for a terminal device is the extent to which the terminal device is expected to move within the wireless telecommunications network, for example in terms of how frequently the terminal device is expected to be handed over from one base station to another. This consideration can be particularly important for MTC-type communications devices since it is expected that certain types of such devices will often have low/no mobility, for example because they are installed in a fixed location for an extended period of time.

To help take account of the extent to which terminal devices are moving within a wireless telecommunications network it is known in UMTS for terminal devices to provide a base station with an estimation for their mobility status, and work is currently in progress for including this functionality to LTE also. See, for example, ETSI TS 136 304 V11.5.0 (September 2013)/3GPP TS 36.304 version 11.5.0 (Release 11) [2] and ETSI TS 136 331 V11.5.0 (September 2013)/3GPP TS 36.331 version 11.5.0 (Release 11) [3].

LTE systems currently incorporate three mobility states, namely normal mobility, medium mobility, and high mobility and UMTS systems incorporate two mobility states, namely normal mobility and high mobility. The mobility state for a given terminal device is determined by counting cell reselections for the terminal device within a given timeframe. For example, in accordance with LTE proposals the default mobility for a terminal device is normal mobility. However, if a terminal device undergoes more than a first threshold number of cell reselections but less than a second threshold number of cell reselections in a particular time period the terminal device mobility status is changed to medium mobility. If the terminal device undergoes more than the second threshold number of cell reselections in the particular time period, the terminal device mobility status is changed to high mobility. A terminal device will return to normal mobility status if the relevant threshold number of cell reselections are not exceeded within a given time period. The mobility status of a terminal device can impact the parameters considered when determining whether the terminal devices to move from one base station to another. The mobility status of a terminal device may be reported to the base station using a "UE mobility state indicator" in RRC Connection Request or Cell Update message signalling in UMTS. The network may then set mobility parameters for the terminal device accordingly. In LTE the mobility status of a terminal device may be used for scaling of mobility parameters in idle and connected mode. Further information on mobility states and scaling in accordance with existing proposals can be found in the relevant standards, for example in Sections 5.2.4.3 ("Mobility States of a UE") and 5.2.4.3.1 ("Scaling rules") in ETSI TS 136 304 V11.5.0 (September 2013)/3GPP TS 36.304 version 11.5.0 (Release 11) [2], the entire contents of which are incorporated herein by reference.

There are also currently ongoing discussions regarding the increased use of mobility status information in wireless telecommunications systems. For example, within an LTE HetNet (heterogeneous network) context work is currently being done in order that the mobility status of a terminal device may be reported to the base station using a "mobilityState" identifier in "RRCConnectionSetupComplete" and within an LTE or UMTS MTC-device context.

As noted above, mobility state estimates (MSE) are generally based on a count of cell reselection/handover events occurring within a given timeframe. However, the inventors have recognised this process can be prone to inaccuracies. For example, mobility state estimation is broadly intended to provide an indication of the speed of a terminal device by calculating cell changes over a period of time. However, factors other than speed can give rise to cell changes, for example changing cell coverage or cells of different coverage (sizes), fading channel conditions, terminal device measurement errors, and reselection/handover parameter settings can affect the accuracy of mobility state estimates. The inventors have further recognise these issues can be particularly significant when seeking to determine the mobility state of a stationary or near stationary terminal device. This is an important issue because there can be significant differences in the most appropriate configuration parameters for low-mobility/stationary terminal devices as compared to terminal devices which have higher mobility. For example, if a terminal device is stationary or slow-moving, it can be more radio efficient to maintain the terminal device in a connected mode (thereby reducing the overhead of RRC connection establishment signalling) for relatively long periods than if a terminal device is moving more quickly (because of the increased handover signalling associated with a more mobile terminal device). In addition, longer and deeper power saving states can generally be configured for a terminal device which is stationary than would be appropriate for a terminal device which is more mobile. However, because of the difficulties associated with accurately determining a terminal device's mobility status in a wireless telecommunications network it may be difficult to optimally configure terminal devices according to their mobility status.

There is therefore a need for improved schemes for communicating information regarding the mobility status of a terminal device in a wireless telecommunications system.

SUMMARY

According to a first aspect of the present disclosure, there is provided a method of operating a terminal device for communicating with a base station in a wireless telecommunications system, the method comprising: determining a mobility status for the terminal device and an associated reliability for the determined mobility status; conveying an indication of the mobility status and an indication of the reliability for the mobility status to the base station; and configuring the terminal device for operation within the wireless telecommunications system in a manner that takes account of both the mobility status and the reliability for the mobility status.

According to a second aspect of the present disclosure, there is provided a terminal device for communicating with a base station in a wireless telecommunications system, wherein the terminal device comprises a controller unit and a transceiver unit configured to operate together to determine a mobility status for the terminal device and an associated reliability for the determined mobility status; to convey an indication of the mobility status and an indication of the reliability for the mobility status to the base station; and to configure the terminal device for operation within the wireless telecommunications system in a manner that takes account of both the mobility status and the reliability for the mobility status.

According to a third aspect of the present disclosure, there is provided circuitry for a terminal device communicating with a base station in a wireless telecommunications system, wherein the circuitry comprises a controller element and a transceiver element configured to operate together to cause the terminal device to determine a mobility status for the terminal device and an associated reliability for the determined mobility status; to convey an indication of the mobility status and an indication of the reliability for the mobility status to the base station; and to configure the terminal device for operation within the wireless telecommunications system in a manner that takes account of both the mobility status and the reliability for the mobility status.

According to a fourth aspect of the present disclosure, there is provided a method of operating a base station for communicating with a terminal device in a wireless telecommunications system, the method comprising: receiving from the terminal device an indication of a determined mobility status for the terminal and an indication of an associated reliability for the mobility status; and configuring the terminal device for operation within the wireless telecommunications system in a manner that takes account of both the mobility status and the reliability for the mobility status.

According to a fifth aspect of the present disclosure, there is provided a base station for communicating with a terminal device in a wireless telecommunications system, wherein the base station comprises a controller unit and a transceiver unit configured to operate together to receive from the terminal device an indication of a determined mobility status for the terminal and an indication of an associated reliability for the mobility status; and to configure the terminal device for operation within the wireless telecommunications system in a manner that takes account of both the mobility status and the reliability for the mobility status.

According to a first aspect of the present disclosure, there is provided circuitry for a base station communicating with a terminal device in a wireless telecommunications system, wherein the circuitry comprises a controller element and a transceiver element configured to operate together to cause the base station to receive from the terminal device an indication of a determined mobility status for the terminal and an indication of an associated reliability for the mobility status; and to configure the terminal device for operation within the wireless telecommunications system in a manner that takes account of both the mobility status and the reliability for the mobility status.

Further respective aspects and features are defined by the appended claims.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Figure 1:
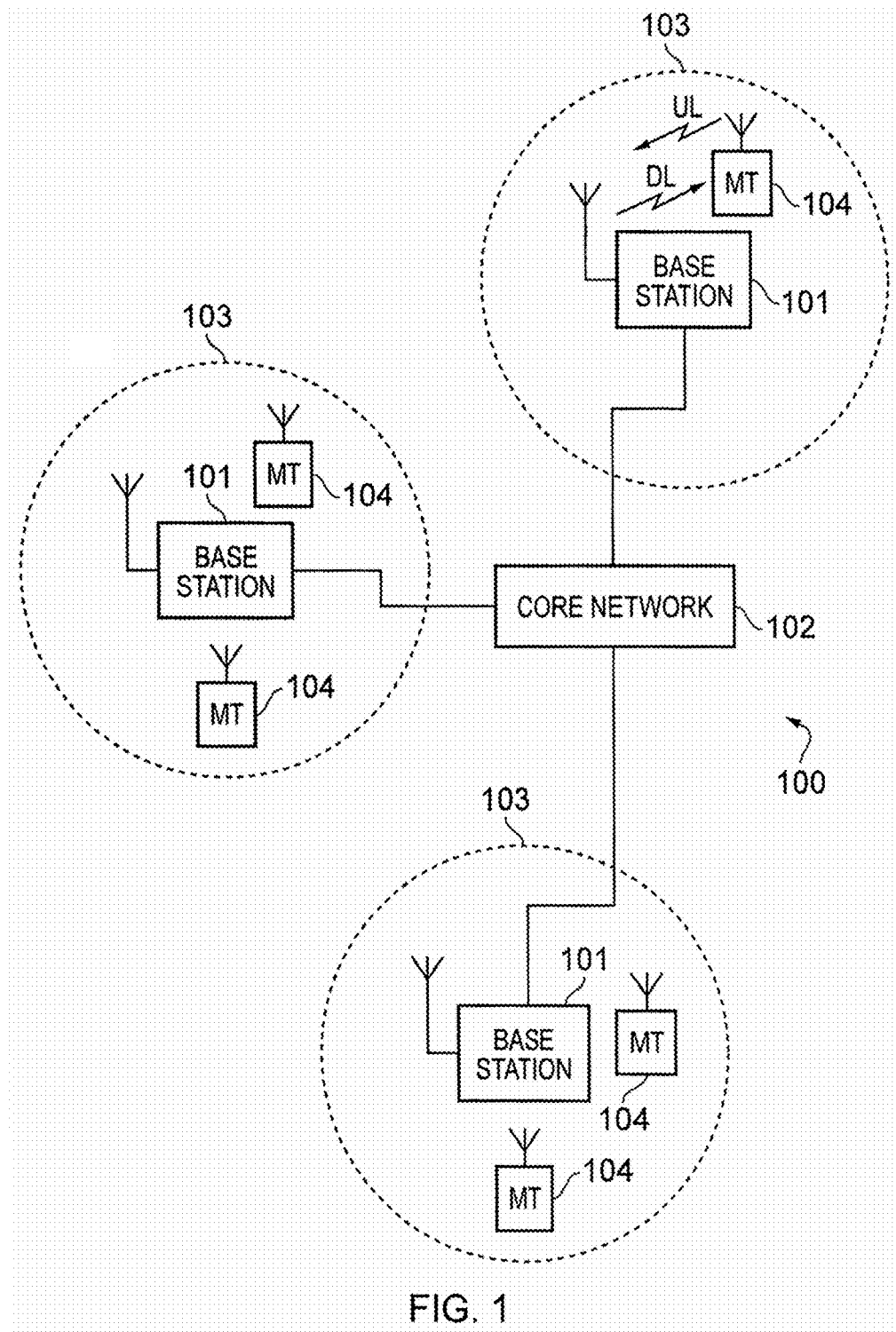
FIG. 1 provides a schematic diagram illustrating an example of a wireless telecommunication system.

FIG. 1 provides a schematic diagram illustrating some basic functionality of a wireless telecommunications network/system 100 operating in accordance with LTE principles and which may be adapted to implement embodiments of the disclosure as described further below. Various elements of FIG. 1 and their respective modes of operation are well-known and defined in the relevant standards administered by the 3GPP® body and also described in many books on the subject, for example, Holma H. and Toskala A [4]. It will be appreciated that operational aspects of the telecommunications network which are not specifically described below may be implemented in accordance with any known techniques, for example according to the relevant standards.

The network 100 includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink. Data is transmitted from terminal devices 104 to the base stations 101 via a radio uplink. The core network 102 routes data to and from the terminal devices 104 via the respective base stations 101 and provides functions such as authentication, mobility management, charging and so on. Terminal devices may also be referred to as mobile stations, user equipment (UE), user terminal, mobile radio, and so forth. Base stations may also be referred to as transceiver stations/nodeBs/e-nodeBs, and so forth.

Figure 2:
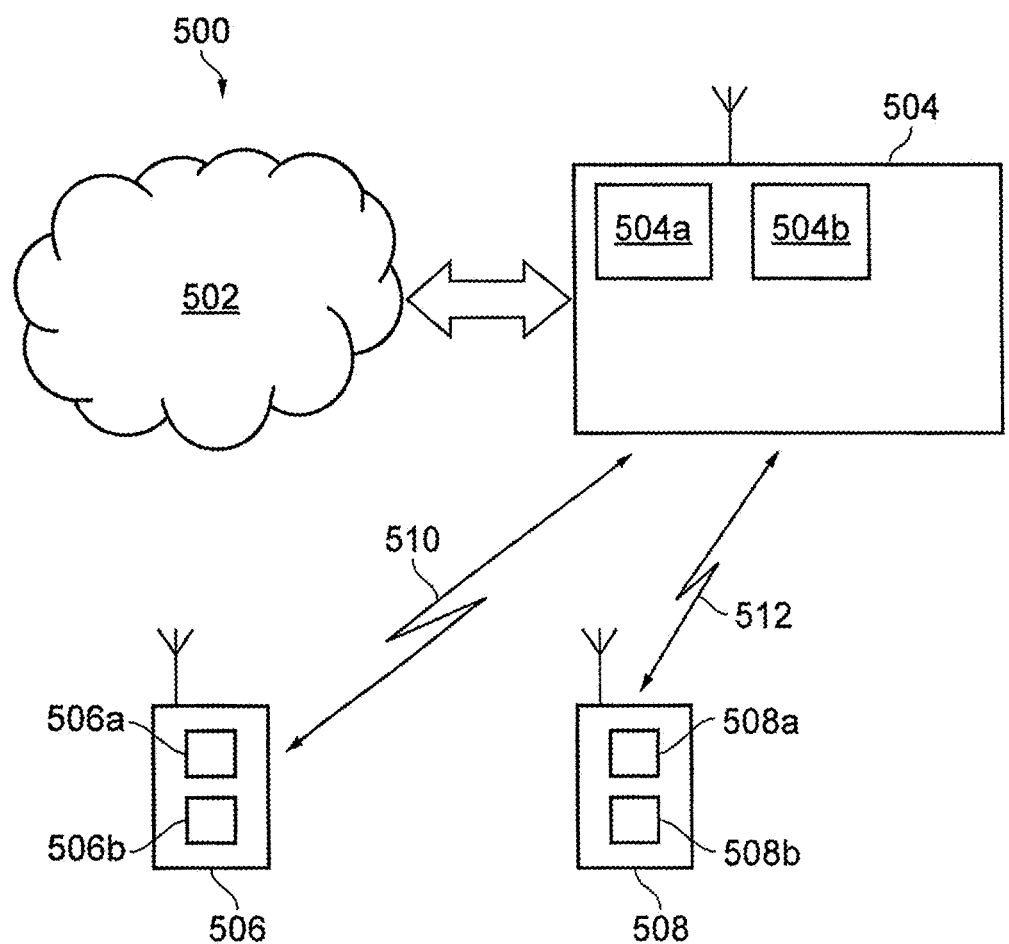
FIG. 2 schematically represents a wireless telecommunications system according to an embodiment of the disclosure.

FIG. 2 schematically shows a telecommunications system 500 according to an embodiment of the disclosure. The telecommunications system 500 in this example is based broadly on a LTE-type architecture. As such many aspects of the operation of the telecommunications system 500 are standard and well understood and not described here in detail in the interest of brevity. Operational aspects of the telecommunications system 500 which are not specifically described herein may be implemented in accordance with any known techniques, for example according to the established LTE-standards and known variations thereof.

The telecommunications system 500 comprises a core network part (evolved packet core) 502 coupled to a radio network part. The radio network part comprises a base station (evolved-nodeB) 504, a first terminal device 506 and a second terminal device 508. It will of course be appreciated that in practice the radio network part may comprise a plurality of base stations serving a larger number of terminal devices across various communication cells. However, only a single base station and two terminal devices are shown in FIG. 2 in the interests of simplicity.

As with a conventional wireless radio network, the terminal devices 506, 508 are arranged to communicate data to and from the base station (transceiver station) 504. The base station is in turn communicatively connected to a serving gateway, S-GW, (not shown) in the core network part which is arranged to perform routing and management of wireless communications services to the terminal devices in the telecommunications system 500 via the base station 504. In order to maintain mobility management and connectivity, the core network part 502 also includes a mobility management entity (not shown) which manages the enhanced packet service, EPS, connections with the terminal devices 506, 508 operating in the communications system based on subscriber information stored in a home subscriber server, HSS. Other network components in the core network (also not shown for simplicity) include a policy charging and resource function, PCRF, and a packet data network gateway, PDN-GW, which provides a connection from the core network part 502 to an external packet data network, for example the Internet. As noted above, the operation of the various elements of the communications system 500 shown in FIG. 2 may be broadly conventional apart from where modified to provide functionality in accordance with embodiments of the disclosure as discussed herein.

In this example, it is assumed the first terminal device 506 is a conventional smart-phone type terminal device communicating with the base station 504. Thus, and as is conventional, this first terminal device 506 comprises a transceiver unit 506a for transmission and reception of wireless signals and a controller unit 506b configured to control the smart phone 506. The controller unit 506b may comprise a processor unit which is suitably configured/programmed to provide the desired functionality using conventional programming/configuration techniques for equipment in wireless telecommunications systems. The transceiver unit 506a and the controller unit 506b are schematically shown in FIG. 2 as separate elements. However, it will be appreciated that the functionality of these units can be provided in various different ways, for example using a single suitably programmed general purpose computer, or suitably configured application-specific integrated circuit(s)/circuitry. As will be appreciated the conventional terminal device 506 will in general comprise various other elements associated with its operating functionality.

In this example, it is assumed the second terminal device 508 is a machine-type communication (MTC) terminal device according to an embodiment of the disclosure. As discussed above, MTC devices may be typically characterised as semi-autonomous or autonomous wireless communication devices communicating small amounts of data. Examples include so-called smart meters which, for example, may be located in a customers house and periodically transmit information back to a central MTC server data relating to the customers consumption of a utility such as gas, water, electricity and so on. MTC devices may in some respects be seen as devices which can be supported by relatively low bandwidth communication channels having relatively low quality of service (QoS), for example in terms of latency. It is assumed here the MTC terminal device 508 in FIG. 2 is such a device. It will, however, the appreciated that embodiments of the disclosure may also be implemented for other types of terminal device.

As with the smart phone 506, the MTC device 508 comprises a transceiver unit 508a for transmission and reception of wireless signals and a controller unit 508b configured to control the MTC device 508. The controller unit 508b may comprise a processor unit which is suitably configured/programmed to provide the desired functionality described herein using conventional programming/configuration techniques for equipment in wireless telecommunications systems. The transceiver unit 508a and the controller unit 508b are schematically shown in FIG. 2 as separate elements for ease of representation. However, it will be appreciated that the functionality of these units can be provided in various different ways, for example using a single suitably programmed general purpose computer, or suitably configured application-specific integrated circuit(s)/circuitry, or using a plurality of discrete circuitry/processing elements for providing different elements of the desired functionality. It will be appreciated the MTC device 508 will in general comprise various other elements associated with its operating functionality in accordance with established wireless telecommunications techniques (e.g. a power source, possibly a user interface, and so forth).

The base station 504 comprises a transceiver unit 504a for transmission and reception of wireless signals and a controller unit 504b configured to control the base station 504. The controller unit 504b may comprise a processor unit which is suitably configured/programmed to provide the desired functionality described herein using conventional programming/configuration techniques for equipment in wireless telecommunications systems. The transceiver unit 504a and the controller unit 504b are schematically shown in FIG. 2 as separate elements for ease of representation. However, it will be appreciated that the functionality of these units can be provided in various different ways, for example using a single suitably programmed general purpose computer, or suitably configured application-specific integrated circuit(s)/circuitry or using a plurality of discrete circuitry/processing elements for providing different elements of the desired functionality. It will be appreciated the base station 504 will in general comprise various other elements associated with its operating functionality. For example, the base station 504 will in general comprise a scheduling entity responsible for scheduling communications. The functionality of the scheduling entity may, for example, be subsumed by the controller unit 504b.

Thus, the base station 504 is configured to communicate data with the smart phone 506 over a first radio communication link 510 and communicate data with the MTC device 508 over a second radio communication link 512. Both radio links may be supported within a single radio frame structure associated with the base station 504. It is assumed here the base station 504 is configured to communicate with the smart phone 506 over the first radio communication link 510 in accordance with the established principles of LTE-based communications and to communicate with the MTC-device 506 over the second radio communication link 512 in accordance with embodiments of the disclosure as described herein. It will be appreciated the base station may readily obtain information indicating the different classes of terminal device which are attached to the base station in accordance with conventional techniques. That is to say, the base station will be aware that the smart phone is of a device class that includes conventional smartphones and the MTC device is of a device class that includes MTC devices.

As noted above it is known for a terminal device to provide a base station with an indication of an estimated mobility status for the terminal device. However, as also noted above, it is difficult for a base station to fully optimise a terminal devices configuration within the network according to its mobility status because of the potential for inaccuracies in the estimated mobility status. To address these issues in accordance with embodiments of the disclosure it is proposed that a terminal device provides a base station with an indication of the accuracy of a reported mobility status to be used in conjunction with the mobility status for configuring the terminal device for operation in the wireless telecommunications system. In this regard a terminal device may be configured to determine its mobility status using different methods from those currently used (i.e. those based on counting cell reselections/handovers) and to in effect indicate to the base station when providing an indication of its mobility status which method was used.

For example, a terminal device may be configured to have the ability to determine and report its mobility status based on cell reselection/handover counting in the normal way. However, the terminal device may be further configured to recognise if it has been connected to a docking station/fixed power supply, and so will remain stationary for as long as it remains connected. Thus, while the terminal device is connected to the docking station/fixed power supply the terminal device could indicate to the base station that the mobility status of the terminal device is that it has low mobility (or is stationary if this is one of the available mobility status levels adopted in a given implementation), and furthermore this mobility status determination has a high degree of accuracy because it is based on the terminal device being physically coupled to an element at a fixed location (i.e. the docking station or power supply). The base station is thus made aware that the terminal device has low mobility/is stationary, and furthermore there is a high degree of certainty in this determination. The base station may therefore proceed to configure the operation of the terminal device in a manner which is appropriate for a terminal device which is known to be stationary. If the terminal device is removed from the docking station it may proceed to provide an updated mobility status and associated reliability indication to the base station based on cell reselection/handover counting in the normal way. That is to say, the terminal device may indicate to the base station that it appears to have low mobility and that this is based on counting cell reselection/handover events. The base station is thus made aware that the terminal device is reporting that it has low mobility/is stationary, but there is a higher degree of uncertainty in this determination as compared to when the terminal device mobility state is determined based on it being coupled to an element in a fixed location. The base station may therefore proceed to configure the operation of the terminal device in a manner which is appropriate for a terminal device which thought to have relatively low mobility, but in fact might have a higher degree of mobility.

There are various different ways in which a terminal device may establish its mobility and these may be associated with different levels of reliability. For example, in one implementation a terminal device may be able to measure its position (and hence determine its mobility) using global positioning satellite (GPS) techniques, or any other known techniques for determining position, known to be associated with a given degree of reliability. In another example a terminal device may be associated with a fixed device property indicating its mobility. For example, a terminal device comprising an MTC-type device such as a smart meter, vending machine or security camera, installed at a fixed location may be configured with the device property "stationary". Thus a terminal device providing a base station with an indication of this device property is in effect providing the base station with an indication of its mobility status and an associated reliability (i.e. high reliability because the terminal device is in fact intended to operate in a fixed location).

Figure 3:
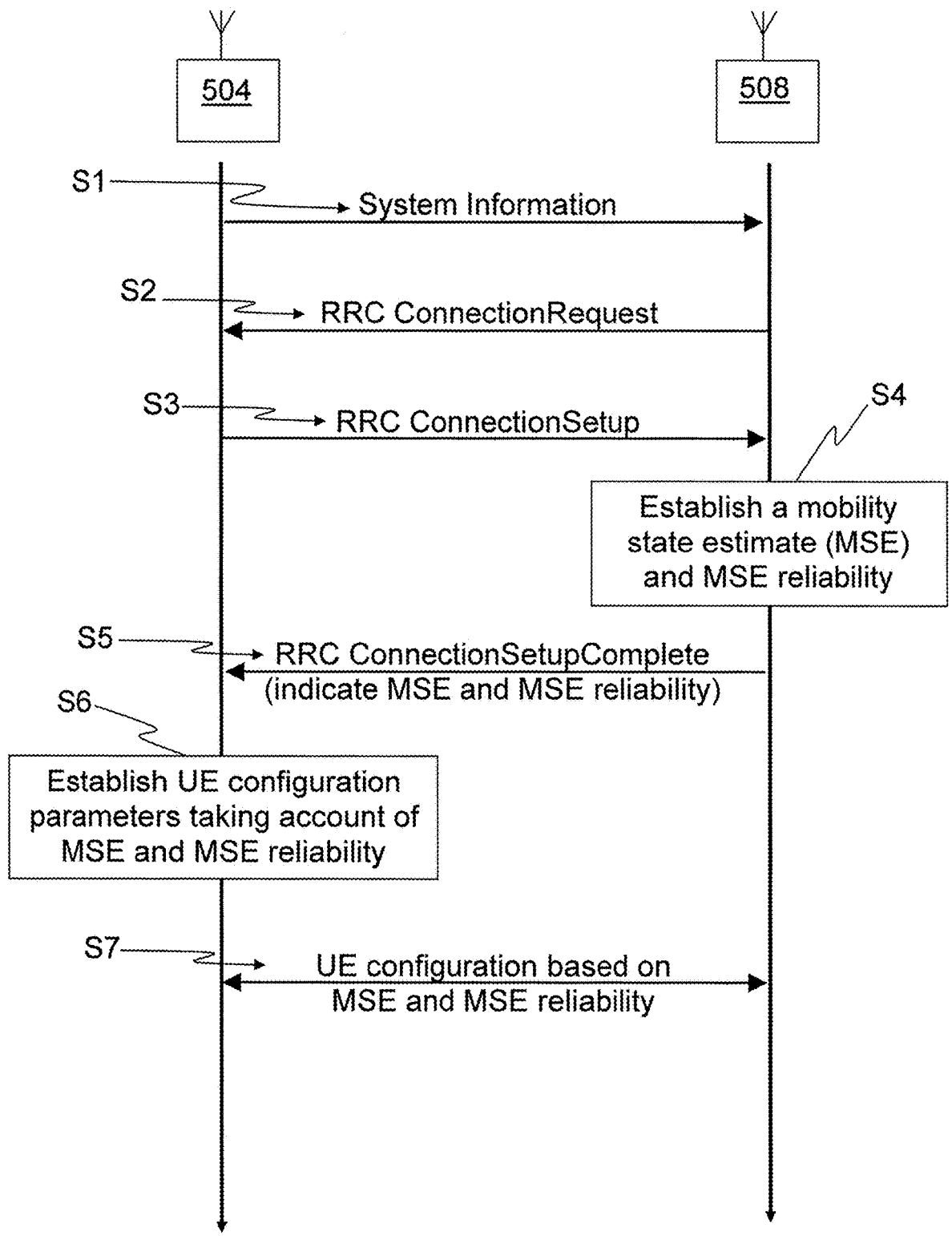
FIG. 3 is a signalling ladder diagram representing communications between a base station and a terminal device operating in accordance with an embodiment of the disclosure.

FIG. 3 is a signalling ladder diagram schematically representing modes of operation for the terminal device 508 and the base station 504 schematically represented in FIG. 2 in accordance with some embodiments of the present disclosure. As already noted above, aspects of the operation of a wireless telecommunications system in accordance with embodiments of the disclosure, for example as represented in FIGS. 2 and 3, which are not specifically described herein may be implemented in accordance with any conventional techniques.

It is assumed the processing represented in FIG. 3 starts at a time when the terminal device 508 is in an idle mode of operation, but will shortly request to move to a connected mode of operation. As is well understood, in an LTE type network there are two Radio Resource Control (RRC) modes for terminal devices, namely: (i) RRC idle mode (RRC_IDLE); and (ii) RRC connected mode (RRC_CONNECTED). To receive user-plane data a terminal device must be in RRC connected mode and the terminal device does not receive user-plane data in RRC idle mode. In RRC idle mode, the core network (CN) part of the wireless telecommunications system recognizes the terminal device is present within the network, but the radio access network (RAN) part of the wireless telecommunications system does not. In effect, in an RRC idle mode the terminal device is not connected to the base station. The process of going from RRC idle mode to RRC connected mode may be referred to as connecting to a cell. The specific reason for the terminal device seeking to transition from idle mode to connected mode in the present example is not significant.

Thus, in step S1 of the processing represented in FIG. 3 the terminal device 508 receives system information from the base station 504 while in idle mode in accordance with the principles underlying conventional techniques for receiving system information in wireless telecommunications systems. The system information may include an indication as to whether or not mobility status reporting in accordance with embodiments of the disclosure is currently implemented. This may be indicated, for example, through the introduction of an new information element in one of the SIBs comprising the system information and which may be set as a "flag" to indicate whether modified mobility status reporting is implemented. In this example it is assumed that the system information received by the terminal device in step S1 indicates that mobility status reporting in accordance with embodiments of the disclosure is currently being supported by the base station 504. However, in other example implementations such reporting may be a permanent feature of the network operation such that it is not specifically indicated as being activated in system information, or an indication that such reporting is active may be provided in conjunction with other signalling, for example in conjunction with a modified version of the RRC connection setup signalling of step S3 discussed further below.

In step S2 the terminal device 508 transmits radio resource control (RRC) connection request signalling to the base station to indicate a desire to transition from idle mode to connected mode. As noted above, the specific reason why the terminal device 508 wishes to make this transition is not significant to the principles underlying the disclosure. The RRC connection request of step S2 may be performed in accordance with conventional techniques.

In step S3 the base station 504 transmits RRC connection setup signalling back to the terminal device 508 in response to receiving the RC connection request signalling step S2. The RRC connection setup signalling of step S3 may be based on conventional techniques.

In step S4 the terminal device establishes a mobility state estimate/mobility status and determines a reliability for the determined mobility status. As noted above, the terminal device may be provided with multiple different ways of establishing its mobility status, and different degrees of reliability may be associated with the different ways of establishing the mobility status. Typically the terminal device will seek to determine its mobility status, and the associated reliability, based on what is considered to be most reliable technique currently available to the terminal device.

For example, assume for the sake of one specific example a terminal device is able to establish its mobility status based on historical cell reselection events during the time it was in idle mode in accordance with conventional techniques (relatively low reliability) and is also able to recognise it has low mobility (with high reliability) when it is connected to a docking station. If this terminal device it is not in the docking station during step S4, it will establish its mobility status (mobility state estimate) based on counting cell reselections in accordance with a conventional techniques, and having relatively low reliability. If, on the other hand, in step S4 the terminal device is in the docking station, it will establish its mobility status (i.e. low mobility/stationary) based on this fact, and wherein this will be established with a relatively high degree of reliability.

In step S5 the terminal device 508 transmits RRC connection setup complete signalling to the base station 504. This signalling may be broadly based on conventional techniques for providing RRC connection setup complete signalling, but whereas conventional RRC connection setup complete signalling may include an indication of mobility status (mobility state estimation), the RRC connection setup complete signalling of step S5 in accordance with an embodiment of the disclosure conveys both an indication of the mobility status established in step S4 and an indication of the reliability of the mobility status.

The specific characterisation of the reliability of the mobility status may be provided in a number of different ways. For example, different degrees of reliability may be associated with different indices and the terminal device may provide an indication of the relevant index in association with its mobility status indication. In one example the indices may simply represent a binary indication of whether the mobility status is to be considered to have a high or a low reliability. For example, the different manners in which the terminal device may establish its mobility status may be associated with high or low reliability according to a predefined scheme. In another example the indication of MSE reliability conveyed by the terminal device may simply be an indication of the method by which the associated mobility status has been determined. In yet another example implementation a terminal device is able to determine its mobility status from an inherent device property (e.g. the terminal device is in effect programmed/hardwired as a "stationary" device). The base station may have access to a table linking identities of terminal devices to an indication of their inherent mobility. In this case the terminal device can in effect provide a base station with an indication of its mobility and the associated reliability by simply providing the base station with an indication of its identity. The base station receiving the indication of the terminal device identity is able to refer to the table linking identities of the terminal devices to their inherent mobility properties to establish the relevant mobility parameters for the terminal device.

In step S6 the base station to which the mobility status and mobility status reliability have been conveyed can establish one or more configuration parameters defining one or more aspects of how the terminal device will operate within the wireless telecommunications system in a manner which takes account of both the indication of mobility status and the indication of reliability for the mobility status received from the terminal device. For example, the base station may be arranged to configure the terminal device for operation within the wireless telecommunications system in a manner that takes account of both the mobility status and the reliability for the mobility status by configuring one or more aspects of the operation of the terminal device selected from the group comprising: (i) one or more parameters of a power saving state; (ii) one or more parameters of a radio resource control, RRC, configuration state—for example a power saving state may be configured for the terminal device to use if it is determined to be stationary (iii) one or more parameters of a discontinuous reception, DRX, mode of operation—for example a slow moving terminal device may benefit from longer DRX periods since it does not need to perform measurements as frequently to support handover; (iv) a duration for which the terminal device remains in a radio resource connected mode—for example a device that is typically sending relatively small amounts of data on a relatively frequent basis may benefit from being kept in connected mode for longer periods of time to avoid signalling overhead associated with RRC Connection establishment, if the terminal device is slow moving or stationary (so there is little or no handover signalling overhead) the network may configure its internal inactivity timer to longer periods of time in order to keep the terminal device in a connected state; (v) cell reselection parameters—for example a longer $T_{reselection}$ for slower moving terminal devices; (vi) measurement parameters and configuration—for example a shorter time-to-trigger for handover measurements when the terminal device is moving faster and/or disabling handover measurements if a terminal device is determined to be stationary (vii) radio bearer or transport and physical channel configuration—for example a slower moving terminal device may suffer less reception error than a faster moving terminal device, so could be configured with a higher data rate.

As schematically indicated in FIG. 3 in step S7 the base station 504 and the terminal device 508 may proceed to communicate with one another/operate within the wireless telecommunications system in accordance with conventional techniques but with the terminal device configuration based, at least in part, on the determined mobility status and reliability of the mobility status. Once the relevant configuration parameters have been determined they may be communicated between the base station and terminal device in accordance with conventional techniques. In some circumstances it may not be necessary for the base station to communicate specific configuration parameters to the terminal device because the terminal device may be able to independently determine what the configuration parameters selected by the base station will be according to the determined mobility status and reliability indications conveyed to the base station.

It will be appreciated the processing of FIG. 3 merely represents some particular example embodiments of the disclosure, and different approaches may be taken in other implementations. For example, in another example implementation the exchange of an indication of mobility status and mobility status reliability might not be associated with RRC connection signalling. Instead, the base station may, for example, be configured to request the terminal device to provide such information on an ad hoc basis, for example when the base station is considering changing the configuration parameters for the terminal devices operation. In another example, the terminal device may be configured to provide an indication of its mobility status and associated reliability in response to determining a change in its mobility status (for example because it has been placed in or disconnected from a dock).

Furthermore, in the example represented in FIG. 3 the determined mobility status and the indication of the reliability of the mobility status are schematically indicated as being transmitted together in step S5. However, in other examples these two indications might be transmitted separately. For example, an indication of what reliability should be attributed to mobility status reports from the terminal device (or by way of a proxy an indication of how the terminal device determines its mobility status) may be a fixed property of the terminal device and conveyed to the base station in association with otherwise conventional terminal device capability signalling.

Furthermore still, it will be appreciated that in some examples the mobility status and mobility status reliability may be combined into a single indication. For example, the mobility status for the terminal device may comprise an indicator that may be selected from among a plurality of predefined indicators for identifying different predefined relative levels of mobility. Some of the indicators comprising this group may be associated with different levels of reliability. For example, the mobility status for a terminal device in one example implementation may be selected from a group comprising:

high-mobility
medium-mobility
low-mobility
stationary with low-reliability
stationary with high-reliability In this example there are five types of mobility status that may be reported. The first three may broadly correspond with conventional mobility state estimation parameters in LTE. However, the last two may correspond with an extension of these three states to include the possibility of a terminal determining it is stationary. One state may be used to indicate the terminal device has determined it is stationary in a manner which has relatively low reliability (e.g. based on cell-reselection/handover counting) while the other state may be used to indicate the terminal device has determined it is stationary in a manner which has relatively high reliability (e.g. based on a fixed device property or the terminal device being (at least temporarily) connected to something at a fixed location (such as a docking station)). The base station may be configured to handle terminal devices reporting they are stationary with low-reliability differently from terminal devices reporting they are stationary with high-reliability. For example, for a terminal device reporting itself to be stationary with low-reliability, the base station may configure handover measurements, or avoid using a power-saving state, whereas for a terminal device reporting itself to be stationary with high-reliability, the network might not configure the terminal device to make handover measurements, and could potentially maintain the terminal device in a connected state for a long time (with other terminal device parameters set accordingly), or configure the terminal device to use a particular power-saving state. As noted above, different manners of determining mobility may be associated with low- and high-reliability according to a predefined association. For example, in one extreme the "stationary with high-reliability" indication may only be available for terminal devices which have "stationary" as an inherent device property.

Thus there has been described a wireless telecommunication system that comprises a base station and a terminal device (UE). The UE is configured to determine its mobility status and an associated reliability, e.g. an indication of the extent to which the UE is moving and the confidence in this determination. In some cases the reliability may be based on how the UE determined its mobility status. For example, if the UE determined itself to be of relatively low mobility because it has an internal configuration setting indicating it is deployed in a fixed position, the reliability of this mobility status may be considered to be greater than if the UE determined itself to be of relatively low mobility because it has not recently undergone many base station handovers/cell reselections. The UE is configured to convey an indication of the mobility status and the reliability to the base station. The base station may then configure the UE for operation within the wireless telecommunications system in a manner that takes account of both the mobility status and the reliability for the mobility status. This can help optimise configuration settings for the UE which depend on device mobility.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1. A method of operating a terminal device for communicating with a base station in a wireless telecommunications system, the method comprising: determining a mobility status for the terminal device and an associated reliability for the determined mobility status; conveying an indication of the mobility status and an indication of the reliability for the mobility status to the base station; and configuring the terminal device for operation within the wireless telecommunications system in a manner that takes account of both the mobility status and the reliability for the mobility status.

Paragraph 2. The method according to paragraph 1, wherein the step of configuring the terminal device for operation within the wireless telecommunications system in a manner that takes account of both the mobility status and the reliability for the mobility status comprises receiving configuration information from the base station wherein the configuration information is determined by the base station in a manner that takes account of both the mobility status and the reliability for the mobility status.

Paragraph 3. The method according to any preceding paragraph, wherein the indication of the mobility status for the terminal device comprises an indicator selected from a group comprising a plurality of indicators for identifying different predefined relative levels of mobility.

Paragraph 4 The method according to paragraph 3, wherein the indication of the mobility status for the terminal device comprises an indication that the terminal device is determined to be have a relatively low mobility.

Paragraph 5 The method according to any preceding paragraph, wherein the indication of the mobility status for the terminal device comprises an indication that the terminal device is determined to be stationary.

Paragraph 6. The method according to any preceding paragraph, wherein there are a number of different ways for terminal devices operating in the wireless telecommunications system to determine their mobility status, and the indication of the reliability for the mobility status comprises an indication of the manner in which the mobility status has been determined.

Paragraph 7. The method according to any preceding paragraph, wherein the indication of the reliability for the mobility status comprises an indication of whether the mobility status has been determined from signalling exchanged between the terminal device and one or more base stations in the wireless telecommunications.

Paragraph 8. The method according to any preceding paragraph, wherein the mobility status comprises an indication of whether the mobility status has been determined by counting handovers and/or cell reselections between base stations for the terminal device.

Paragraph 9. The method according to any preceding paragraph, wherein the step of conveying an indication of the mobility status and an indication of the reliability for the mobility status to the base station comprises conveying an indication of a mobility status associated with a pre-defined reliability.

Paragraph 10. The method according to any preceding paragraph, wherein the mobility status for the terminal device is predefined for the terminal device.

Paragraph 11. The method of paragraph 10, wherein an indication of the predefined mobility status for the terminal device is available to the base station and conveying the indication of the mobility status and the indication of the reliability for the mobility status to the base station comprises conveying an identifier for the terminal device.

Paragraph 12. The method of paragraph 10 or 11, wherein an indication of the predefined mobility status for the terminal device is stored in association with a network part of the wireless telecommunications system.

Paragraph 13. The method according to any preceding paragraph, wherein the mobility status for the terminal device and/or the reliability for the mobility status is determined from a plurality of previously determined locations for the terminal device.

Paragraph 14. The method according to any preceding paragraph, wherein the mobility status for the terminal device and/or the reliability for the mobility status is determined from the terminal device being connected to an element of its environment.

Paragraph 15. The method according to any preceding paragraph, wherein the indication of mobility status for the terminal device and/or the indication of reliability for the mobility status is conveyed by the terminal device to the base station in response to the terminal device determining there has been a change in mobility status and/or the reliability for the terminal device as compared to a previously conveyed indication of mobility status for the terminal device and/or indication of reliability for the mobility status.

Paragraph 16. The method according to any preceding paragraph, wherein configuring the terminal device for operation within the wireless telecommunications system in a manner that takes account of both the mobility status and the reliability for the mobility status comprises configuring an aspect of the operation of the terminal device selected from the group comprising: (i) one or more parameters of a power saving state; (ii) one or more parameters of a radio resource control, RRC, configuration state (iii) one or more parameters of a discontinuous reception, DRX, mode of operation; (iv) a duration for which the terminal device remains in a radio resource connected mode; (v) cell reselection parameters; (vi) measurement parameters and configuration; and (vii) radio bearer or transport and physical channel configuration.

Paragraph 17. The method according to any preceding paragraph, wherein the indication of the mobility status and/or the indication of the reliability for the mobility status is conveyed to the base station during a radio resource connection setup procedure.

Paragraph 18. A terminal device for communicating with a base station in a wireless telecommunications system, wherein the terminal device comprises a controller unit and a transceiver unit configured to operate together to determine a mobility status for the terminal device and an associated reliability for the determined mobility status; to convey an indication of the mobility status and an indication of the reliability for the mobility status to the base station; and to configure the terminal device for operation within the wireless telecommunications system in a manner that takes account of both the mobility status and the reliability for the mobility status.

Paragraph 19. Circuitry for a terminal device communicating with a base station in a wireless telecommunications system, wherein the circuitry comprises a controller element and a transceiver element configured to operate together to cause the terminal device to determine a mobility status for the terminal device and an associated reliability for the determined mobility status; to convey an indication of the mobility status and an indication of the reliability for the mobility status to the base station; and to configure the terminal device for operation within the wireless telecommunications system in a manner that takes account of both the mobility status and the reliability for the mobility status.

Paragraph 20. A method of operating a base station for communicating with a terminal device in a wireless telecommunications system, the method comprising: receiving from the terminal device an indication of a determined mobility status for the terminal and an indication of an associated reliability for the mobility status; and configuring the terminal device for operation within the wireless telecommunications system in a manner that takes account of both the mobility status and the reliability for the mobility status.

Paragraph 21. A base station for communicating with a terminal device in a wireless telecommunications system, wherein the base station comprises a controller unit and a transceiver unit configured to operate together to receive from the terminal device an indication of a determined mobility status for the terminal and an indication of an associated reliability for the mobility status; and to configure the terminal device for operation within the wireless telecommunications system in a manner that takes account of both the mobility status and the reliability for the mobility status.

Paragraph 22. Circuitry for a base station communicating with a terminal device in a wireless telecommunications system, wherein the circuitry comprises a controller element and a transceiver element configured to operate together to cause the base station to receive from the terminal device an indication of a determined mobility status for the terminal and an indication of an associated reliability for the mobility status; and to configure the terminal device for operation within the wireless telecommunications system in a manner that takes account of both the mobility status and the reliability for the mobility status.

REFERENCES

[1] ETSI TS 122 368 V11.6.0 (September 2012)/3GPP TS 22.368 version 11.6.0 (Release 11)
[2] ETSI TS 136 304 V11.5.0 (September 2013)/3GPP TS 36.304 version 11.5.0 (Release 11)
[3] ETSI TS 136 331 V11.5.0 (September 2013)/3GPP TS 36.331 version 11.5.0 (Release 11)
[4] Holma H. and Toskala A, "LTE for UMTS OFDMA and SC-FDMA based radio access", John Wiley and Sons, 2009

What is claimed is:

1. A method of operating a terminal device for communicating with a base station in a wireless telecommunications system, the method comprising:
    determining a mobility status for the terminal device and an associated reliability for the determined mobility status;
    conveying an indication of the mobility status and an indication of the reliability for the mobility status to the base station;
    configuring the terminal device to make at least one handover measurement when the indication of the mobility status is a first setting and the indication of the reliability of the mobility status has a first setting; and
    configuring the terminal device to be in a power-saving state when the indication of the mobility status is the first setting and the indication of the reliability of the mobility status has a second setting different from the first setting.

2. The method according to claim 1, further comprising:
    configuring the terminal device for operation within the wireless telecommunications system in a manner that takes account of both the mobility status and the reliability for the mobility status; and
    receiving configuration information from the base station wherein the configuration information is determined by the base station in a manner that takes account of both the mobility status and the reliability for the mobility status.

3. The method according to claim 1, wherein the indication of the mobility status for the terminal device comprises an indicator selected from a group comprising a plurality of indicators for identifying different predefined relative levels of mobility.

4. The method according to claim 3, wherein the indication of the mobility status for the terminal device comprises an indication that the terminal device is determined to have a relatively low mobility.

5. The method according to claim 1, wherein the indication of the mobility status for the terminal device comprises an indication that the terminal device is determined to be stationary.

6. The method of claim 1, wherein the indication of the reliability for the mobility status comprises an indication of whether the mobility status has been determined from signalling exchanged between the terminal device and one or more base stations in the wireless telecommunications.

7. The method of claim 1, wherein the mobility status comprises an indication of whether the mobility status has been determined by counting handovers and/or cell reselections between base stations for the terminal device.

8. The method of claim 1, wherein the step of conveying an indication of the mobility status and an indication of the reliability for the mobility status to the base station comprises conveying an indication of a mobility status associated with a pre-defined reliability.

9. The method of claim 1, wherein the mobility status for the terminal device is predefined for the terminal device.

10. The method of claim 9, wherein an indication of the predefined mobility status for the terminal device is available to the base station and conveying the indication of the mobility status and the indication of the reliability for the mobility status to the base station comprises conveying an identifier for the terminal device.

11. The method of claim 9, wherein an indication of the predefined mobility status for the terminal device is stored in association with a network part of the wireless telecommunications system.

12. The method of claim 1, wherein the mobility status for the terminal device and/or the reliability for the mobility status is determined from a plurality of previously determined locations for the terminal device.

13. The method of claim 1, wherein the mobility status for the terminal device and/or the reliability for the mobility status is determined from the terminal device being connected to a stationary object.

14. The method of claim 1, wherein the indication of mobility status for the terminal device and/or the indication of reliability for the mobility status is conveyed by the terminal device to the base station in response to the terminal device determining there has been a change in mobility status and/or the reliability for the terminal device as compared to a previously conveyed indication of mobility status for the terminal device and/or indication of reliability for the mobility status.

15. The method of claim 1, further comprising configuring an aspect of the operation of the terminal device selected from the group comprising: (i) one or more parameters of a power saving state; (ii) one or more parameters of a radio resource control, RRC, configuration state (iii) one or more parameters of a discontinuous reception, DRX, mode of operation; (iv) a duration for which the terminal device remains in a radio resource connected mode; (v) cell reselection parameters; (vi) measurement parameters and configuration; and (vii) radio bearer or transport and physical channel configuration.

16. The method of claim 1, wherein the indication of the mobility status and/or the indication of the reliability for the mobility status is conveyed to the base station during a radio resource connection setup procedure.

17. Circuitry for a terminal device communicating with a base station in a wireless telecommunications system, wherein the circuitry to:
   determine a mobility status for the terminal device and an associated reliability for the determined mobility status;
   convey an indication of the mobility status and an indication of the reliability for the mobility status to the base station;
   configure the terminal device to make at least one handover measurement when the indication of the mobility status is a first setting and the indication of the reliability of the mobility status has a first setting; and
   configure the terminal device to be in a power-saving state when the indication of the mobility status is the first setting and the indication of the reliability of the mobility status has a second setting different from the first setting.

18. The circuitry according to claim 17, wherein the circuitry is further configured to:
   configure the terminal device for operation within the wireless telecommunications system in a manner that takes account of both the mobility status and the reliability for the mobility status; and
   receive configuration information from the base station wherein the configuration information is determined by the base station in a manner that takes account of both the mobility status and the reliability for the mobility status.

19. The circuitry according to claim 17, wherein the indication of the mobility status for the terminal device comprises an indicator selected from a group comprising a plurality of indicators for identifying different predefined relative levels of mobility.

20. The circuitry according to claim 19, wherein the indication of the mobility status for the terminal device comprises an indication that the terminal device is determined to have a relatively low mobility.

* * * * *